United States Patent [19]

Washizu et al.

[11] Patent Number: 4,679,668
[45] Date of Patent: Jul. 14, 1987

[54] BRAKE CONTROL APPARATUS FOR A VEHICLE

[75] Inventors: Shoichi Washizu; Takeshi Morijiri; Kazuo Kogure, all of Gunma; Satoshi Arimitsu, Kanagawa, all of Japan

[73] Assignees: Fuji Heavy Industries Ltd., Tokyo; Nippon Air Brake Co., Ltd., Kobe, both of Japan

[21] Appl. No.: 855,082

[22] Filed: Apr. 22, 1986

[30] Foreign Application Priority Data

Apr. 25, 1985 [JP] Japan .................................. 60-90494

[51] Int. Cl.$^4$ .............................................. B60T 11/28
[52] U.S. Cl. ................................ 188/353; 188/181 T; 188/349; 192/3 H; 303/89
[58] Field of Search ............... 188/353, 181 T, 151 A; 192/3 H; 303/89

[56] References Cited

U.S. PATENT DOCUMENTS

| 3,346,078 | 10/1967 | Dobb ................................... 188/346 |
| 3,384,423 | 5/1968 | Cumming ........................ 188/349 X |
| 3,689,121 | 9/1972 | Kawabe et al. .................. 188/181 T |
| 3,699,679 | 10/1972 | Bardos et al. .................. 303/6 C X |
| 3,949,845 | 4/1976 | Newstead et al. ................ 188/331 |
| 4,247,154 | 1/1981 | Shoji et al. ................... 192/13 A X |
| 4,292,883 | 10/1981 | Riguart et al. ................ 303/6 C X |
| 4,371,060 | 2/1983 | Iwata ............................ 188/73.38 |
| 4,520,911 | 6/1985 | Gaiser ........................... 188/353 X |

FOREIGN PATENT DOCUMENTS

| 1480005 | 7/1969 | Fed. Rep. of Germany ... 188/181 T |
| 53423 | 4/1979 | Japan ............................ 188/151 A |
| 146653 | 8/1954 | Sweden .......................... 192/3 T R |

Primary Examiner—George E. A. Halvosa
Attorney, Agent, or Firm—Jones, Day, Reavis & Pogue

[57] ABSTRACT

A brake control apparatus for a vehicle includes brake apparatus for the respective wheels which are operated by pressurized fluid from a master cylinder; an electro-magnetic valve arranged in a conduit connecting the master cylinder with at least one of the brake apparatus, the electro-magnetic valve being normally in the communicating state and being changed over into the intercepting state by an external instruction; at least one of the brake apparatus being of the disc brake type, the one comprising; (a) a disc rotor; (b) first and second friction pad assemblies for engagement with opposite sides of the disc rotor, the assemblies being guided for movement towards the disc rotor; (c) a caliper body straddling the peripheral edge of the disc rotor and the first and second friction assemblies; (d) an actuating member arranged in the caliper body for urging the first and second friction pad assemblies into engagement with the disc rotor, and (e) elastically deformable retainers for supporting the first and second friction pad assemblies in the peripheral direction; at least one of the first and second friction pad assemblies being movable within a predetermined range in the peripheral direction in accordance with the change of the direction of the frictional force with the disc rotor and a switch for detecting the peripheral displacement of the one of the first and second friction pad assemblies and generating the external instruction for the electro-magnetic valve.

10 Claims, 5 Drawing Figures

BRAKE CONTROL APPARATUS FOR A VEHICLE

BACKGROUND OF THE INVENTION

1. Field of the Invention

This invention relates to a brake control apparatus for a vehicle.

2. Description of the Prior Art

For example, U.S. Pat. No. 4,247,154 discloses the brake control apparatus in which the valve apparatus interconnected to a clutch pedal is closed by treading the clutch pedal and so the brake fluid pressure is held in the wheel cylinder of the automobile on the upwardly inclined roadway. Thus, the driver can release the foot from the brake pedal, while the automobile can be maintained to stop on the upwardly inclined roadway. However, the clutch pedal should continue to be trodden for holding the brake fluid pressure.

To start the automobile, the driver or operator shifts the gears and gradually releases the clutch pedal from treading. The clutch mechanism connected to the clutch pedal through the wire is put into the semi-clutching condition. In such a condition, the driver steps on the accelerator pedal to raise the speed of the engine. Thus, the automobile starts to run.

As above described, when the automobile should be brought to a stop facing upwardly on an inclined roadway, the clutch pedal is trodden to close the valve apparatus. And when the automobile is started to run, the clutch pedal is released to open the valve apparatus. However, when parts related to the valve apparatus or clutch pedal such as a clutch friction lining wear, the relationship changes between the pushed position of the clutch pedal and the timing of transmitting the drive force sufficient to start the automobile from the engine to the wheel through the clutch friction lining, although the relationship is constant between the pushed position of the clutch pedal and the timing of opening the valve apparatus. Thus, before the drive force sufficient to start the automobile is transmitted to the wheel, the braking force is relieved.

In the prior art, when the position of the clutch pedal puts the clutch apparatus into the semi-clutch condition, the braking force is set to be relieved. However, when the clutch friction lining wears, the position of the clutch pedal for putting into the semi-clutch condition changes. The timing of relieving the braking force is not changed with the position of the clutch pedal for putting into the semi-clutch condition. That is the reason for the above-described disadvantage.

When the timing of transmitting the sufficient drive force to the wheel does not correspond with the timing of relieving the braking force, there is the danger that the automobile is moved backwards to cause an accident on the start on the upwardly inclined roadway.

In order to solve the above described problems, the same assignee as this application proposed in the U.S. application No. 797,941, filed Nov. 14, 1985, the brake control apparatus of the drum brake type which can effect a proper operation in accordance with the condition of the wheel or body on the start and stop of the automobile.

SUMMARY OF THE INVENTION

Accordingly, it is an object of this invention to provide a brake control apparatus of the disc brake type for vehicle which can effect a proper operation in accordance with the condition of the wheel or body on the start and stop of the automobile.

In accordance with an aspect of this invention, a brake control apparatus for a vehicle comprises: (A) Brake apparatus for the respective wheels which are operated by pressurized fluid from a master cylinder; (B) an electromagnetic valve arranged in a conduit connecting said master cylinder with at least one of said brake apparatus, said electro-magnetic valve being normally in the communicating state and being changed over into the intercepting state by an external instruction; (C) at least one of said brake apparatus being of the disc brake type, said one comprising: (a) a disc rotor; (b) first and second friction pad assemblies for engagement with opposite sides of said disc rotor, said assemblies being guided for movement towards said disc rotor (c) a caliper body straddling the peripheral edge of disc rotor and said first and second friction pad assemblies; (d) actuating means arranged in said caliper body for urging said first and second friction pad assemblies into engagement with said disc rotor, and (e) elastically deformable retainers for supporting said first and second friction pad assemblies in the peripheral direction in the stationary member: (D) at least one of the first and second friction pad assemblies being movable within a predetermined range in the peripheral direction in accordance with the change of the direction of the frictional force with disc rotor; and (E) a switch for detecting the peripheral displacement of the one of the first and second friction pad assemblies and generating the external instruction for the electro-magnetic valve:

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENT

First, a disc brake in a brake control apparatus according to one embodiment of this invention will be described with reference to FIG. 1 to FIG. 3.

Figure 1:
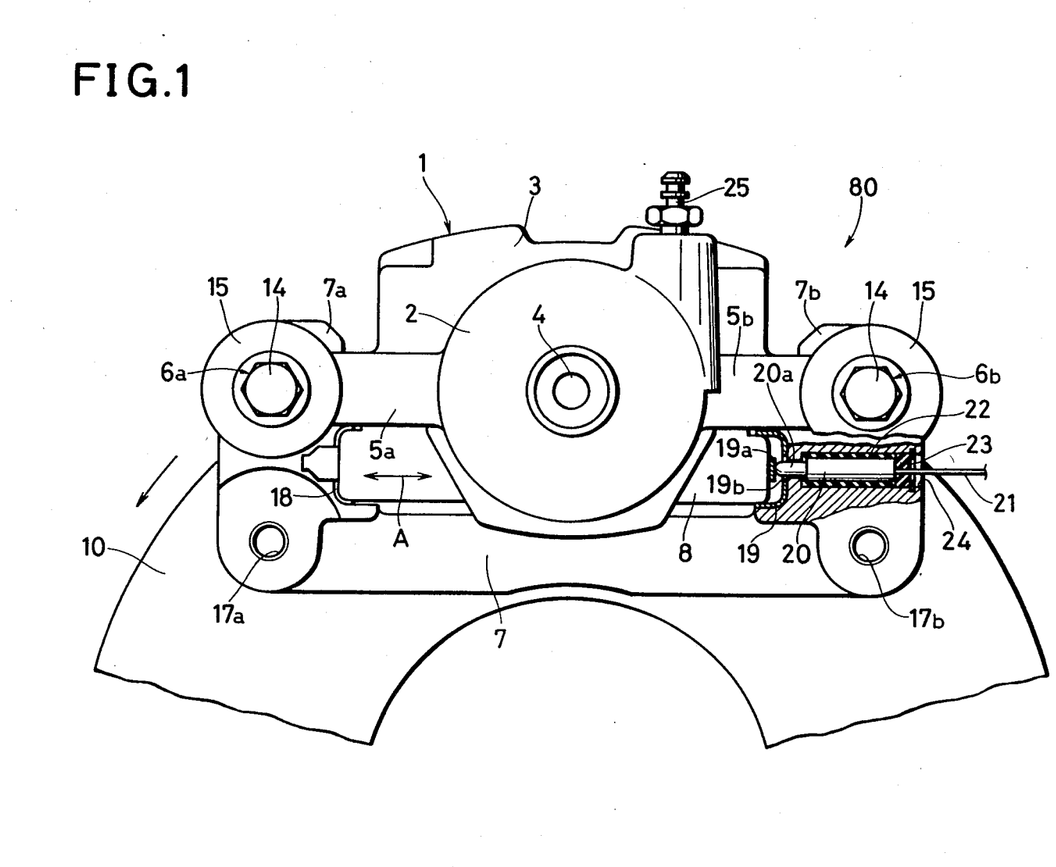
FIG. 1 is a partly broken away front view of a disc brake in brake control apparatus according to one embodiment of this invention.
Figure 2:
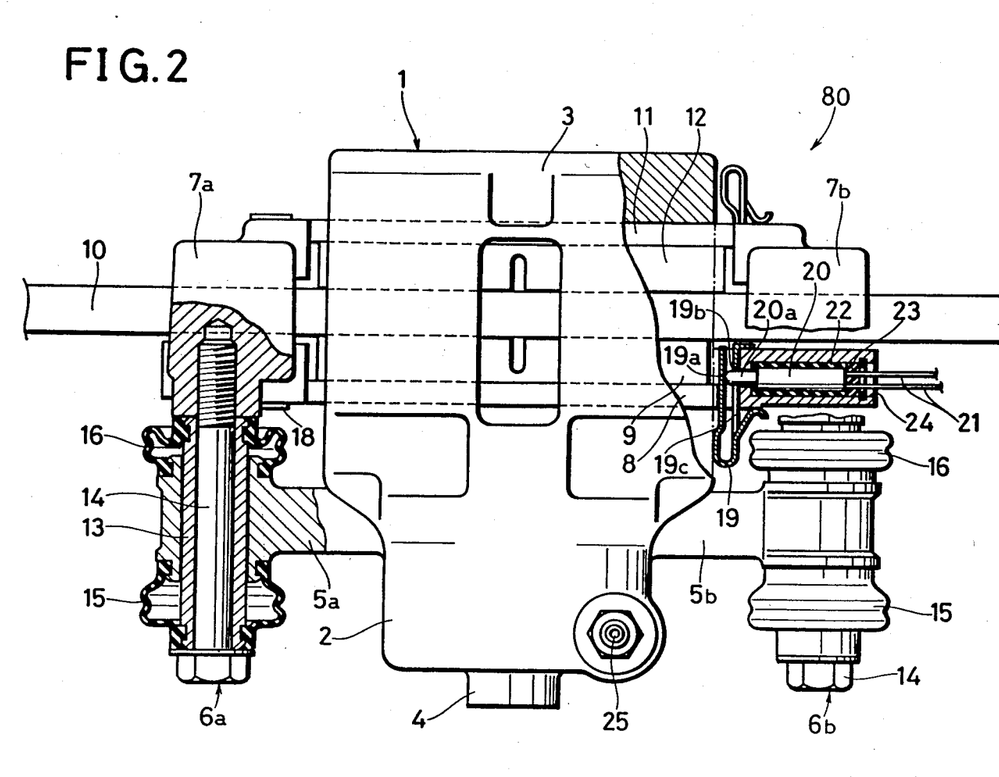
FIG. 2 is a partly broken away plan view of the disc brake of FIG. 1.
Figure 3:
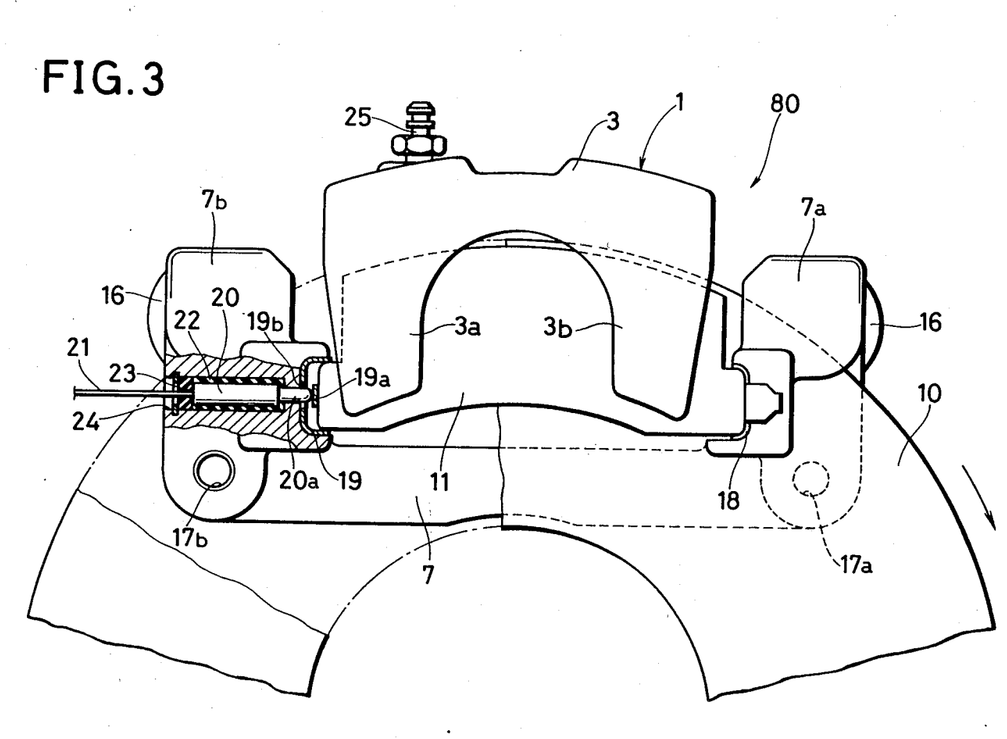
FIG. 3 is a back view of the disc brake of FIG. 1.

In FIG. 1 to FIG. 3, the disc brake is generally designated by a reference numeral 80. Its main body 1 as a caliper body consists of a cylinder portion 2 and a caliper portion 3, and has well-known internal structure. An input port 4 is formed on the cylinder portion 2 for receiving fluid pressure from a master cylinder. The fluid pressure is applied to a piston (not shown) in the cylinder portion 2. The piston is slided forwards along a cylindrical hole in the cylinder portion 2. The main body 1 consisting of the cylinder portion 2 and the caliper portion 3 is so constructed as to move in an opposite direction to the moving direction of the piston by the reaction.

A pair of lateral arm portions 5a and 5b are integrally formed with the cylinder portion 2, and they are so slidably guided as to move backwards and forwards by a pair of guide devices 6a and 6b which are supported by arm portion 7a and 7b of a carrier 7 as a stationary body fixed to a chassis of the vehicle.

The top end of the piston in the cylinder portion 2 of the main body 1 contacts with a rigid backing plate or pad plate 8. A pad or a brake lining 9 is attached to the pad plate 8. The caliper portion 3 straddles a peripheral edge of a disc rotor 10 which rotates with the wheel. Arm portions 3a and 3b of the caliper portion 3 contact with another pad plate 11. A brake lining 12 is attached to the other pad plate 11. There are slight gaps between the brake linings 9, 12 and the disc rotor 10.

Since the guide devices 6a and 6b have the same construction, next only one 6a of them will be described.

In the guide device 6a, a sleeve 13 is slidably fitted to a hole made in the arm portion 5a of the cylinder portion 2 of the main body 1. A bolt 14 is inserted through the sleeve 13, and it is screwed and fastened to the arm portion 7a of the carrier 7. Thus, the bolt 14 and the sleeve 13 are united with the carrier 7 as one body. End portions of the sleeve 13 are covered with flexible rubber boots 15 and 16.

The other guide device 6b is similarly constructed. The main body 1 is slidably guided in the axial direction by the guide devices 6a and 6b.

The pad plates 8 and 11 are elastically supported on the arm portions 7a and 7b of the carrier 7 by lead-in side retainers 18, 18 and lead-out side retainers 19, 19 which are formed by bending lead springs, and they are movable within predetermined lengths in the axial direction and the peripheral direction shown by the arrow A in FIG. 1. The lead-out side retainers 18, 18, as occasion demands, may be omitted in order to increase the moving length of the pad plates 8 and 11 in the peripheral direction.

A recess 24 extending in the peripheral direction is made in the one arm portion 7b of the carrier 7. A switch 20 is fitted to the recess 24. An actuating rod 20a of the switch 20 is passing through a cut-out portion 19c formed in one bending portion 19b of the lead-in side retainer 19, and contacts with another bending portion 19a of the same retainer 19. The bending portion 19a and 19b of the retainers 19, 19 contact elastically with one side surfaces of the pad plates 8 and 11, and the inside surfaces of the arm portions 7b of the carrier 7. The actuating rod 20a is urged leftwards (FIG. 1) by a spring which is contained by the switch 20, and it contacts elastically with the bending portion 19a of the retainer 19.

The brake linings 9, 12 of the pad plates 8, 11 contact sometimes temporarily with the disc rotor 10 by vibration (so called "dragging phenomenon"), although no fluid pressure is supplied into the input port 4 of the main body 1. At that time, the pad plate 8 is urged rightwards (FIG. 1) by the frictional force between the brake lining 9 and the disc rotor 10. However, the sum of the elastic force of the bending portion 19a of the retainer 19, and spring force of the spring which is contained by the switch 20 and urges leftwards the actuating rod 20a, is so designed as to be further larger than the rightward urging force due to the frictional force due to vibration between the brake lining 9 and the disc rotor 10.

A rubber tube 22 and a rubber ring 23 are pressedly arranged between the switch 20 and the inside wall of the recess 24. Thus, the switch 20 is intercepted from vibration transmitted to the carrier 7, and from heat transmitted thereto.

The whole disc brake 80 is fixed to a part of a not-shown body chassis of the vehicle through fixing holes 17a and 17b made in the carrier 7. In FIG. 1 to FIG. 3, reference numerals 21 and 25 designate lead wires and a bleeder, respectively.

The construction of the disc brake 80 in this embodiment has been described above. Next, the whole brake control apparatus including the above disc brake 80 will be described with reference to FIG. 4.

Figure 4:
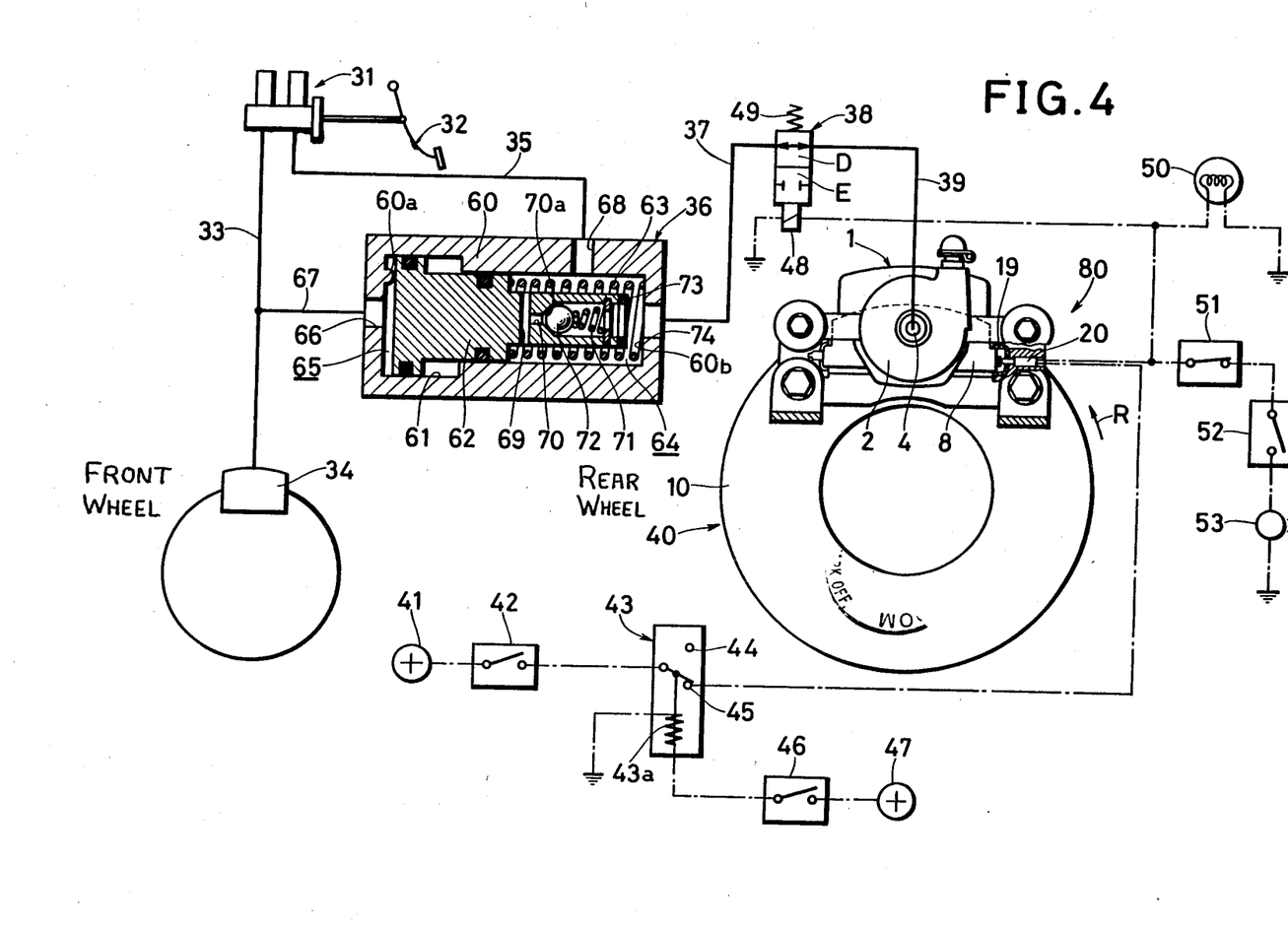
FIG. 4 is a schematic view showing a conduit system and an electrical circuit of a brake control circuit according to the one embodiment of this invention.

In FIG. 4, a brake pedal 32 is combined with a tandem master cylinder 31. A first fluid pressure generating chamber of the tandem master cylinder 31 is connected to a wheel cylinder of front wheel 34 through a conduit 33. A disk brake is employed for the front wheel 34. A second fluid pressure generating chamber of the tandem master cylinder 31 is connected to the cylinder portion 2 of the above disc brake 80 in a rear wheel 40 through a conduit 35, a valve apparatus 36 to be described hereinafter in detail, a conduit 37, an electro-magnetic valve 38 and a conduit 39. In FIG. 4, a tyre is omitted in the rear wheel 40 for simplification of the drawing.

In FIG. 4, electric wires are shown by dot-dash lines. One electric wire connected to the switch 20 is connected to a positive terminal 41 of a battery, an ignition switch 42 and a relay 43. Another electric wire connected to the switch 20 is connected to a solenoid 48 of the above-mentioned electro-magnetic valve 38, an operation display lamp 50, a parking switch 51, a door switch 52 and a buzzer 53.

A solenoid 43a of the relay 43 is connected to a reverse switch 46 and a positive terminal 47 of a battery. When the gears are changed for backward movement, the reverse switch 46 is closed to energize the solenoid 48a, and a movable contact of the relay 43 is changed over to a stationary contact 44. When the reverse switch 44 is opened, the movable contact of the relay 43 is connected to another stationary contact 45, as shown in FIG. 4.

When the ignition switch 42 and the switch 20 are closed in the shown condition, a current from the positive terminal 41 of the battery flows to the solenoid 48 of the electro-magnetic valve 38 and the operation display lamp 50.

The electro-magnetic valve 38 is of the two-position change-over type. When the solenoid 48 is not energized, it takes one position D by action of a spring 49 so that the conduits 37 and 39 are made to communicate with each other. When the solenoid 48 is energized, it takes another position E so that the conduits 37 and 39 are intercepted from each other.

When the parking brake is not operated, the parking switch 51 is closed, as shown in FIG. 4, and when the parking brake is operated, it is opened. When the door is closed, the door switch 52 is opened, as shown in FIG. 4, and when the door is opened, it is closed. Accordingly, when the switch 20 is closed in the rear wheel 40, and the door is opened without operating the parking brake, the buzzer 53 is energized.

Next, there will be described details of the valve apparatus 36.

A main body 60 has a stepped hole 61. A stepped piston 62 provided with seal rings is slidably fitted into the stepped hole 61. Master cylinder pressure chambers 64 and 65 are formed at both sides of the stepped piston 62, and they always communicate with the pressure generating chambers of the master cylinder 31 through path holes 68 and 66 and the conduits 35, and 67, 33, respectively. The stepped piston 62 is urged leftwards by a spring 63, and so normally contacts with a projection 60a formed on the left end wall of the main body 60.

A radial through hole 69 is made in a smaller diameter portion of the stepped piston 62. Further, an axial stepped hole 70 is made there in communication with the radial through hole 69. A valve ball 72 is arranged in a large diameter portion of the stepped hole 70, and urged to a slant step 70a by a spring 71. The slant step 70a functions as a valve seat.

A rubber ring 73 is attached to the right end surface of the stepped piston 62, and facing to the inner right end wall of the main body 60. It is concentric with a port 74 formed in the inner right end wall. When the stepped piston 62 is moved rightwards, and the rubber ring 74 contacts with a wall portion 60b around th port 74, the master cylinder pressure chamber 64 is intercepted from the port 74. Thus, the wall portion 60b functions as a valve seat.

However, the pressurized fluid from the master cylinder pressure chamber 64 can open the valve ball 72 so that it can flow through the hole 69, the small-diameter portion of the stepped hole 70, and the port 74 towards the side of the conduit 37. The reverse flow from the side of the conduit 37 is prohibited. Thus, a check valve is constituted by the valve ball 72, the spring 71 and the valve seat 70a.

Next, there will be described operations and functions of the above-described brake control apparatus.

Figure 5:
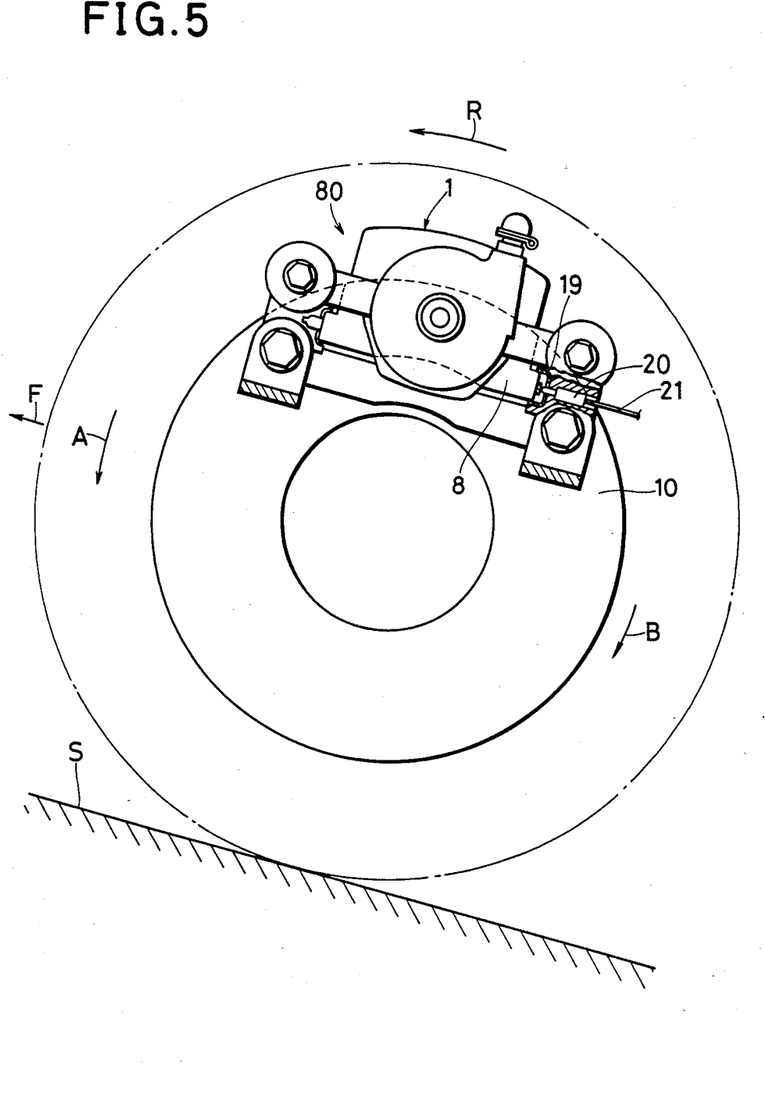
FIG. 5 is a schematic side view of a wheel running on an inclined roadway for explaining an operation principle of this invention.

Now, it is assumed that the automobile provided with the above-described brake control apparatus runs on the upwardly inclined roads in a direction shown by the arrow F in FIG. 5. Accordingly, the wheel rotates in a direction shown by the arrow A. In FIG. 4, the ignition switch 42 is closed, and the other switches and parts are located at the shown condition.

The brake pedal 32 is trodden to stop the automobile. The pressurized fluid from the master cylinder 31 is supplied through the conduit 33 to the wheel cylinder of the front wheel 34, and supplied through the conduit 35, the port 68 of the valve apparatus 36, the master cylinder pressure chamber 64 thereof, the port 74 thereof, the conduit 37, the electro-magnetic valve 38 of the position D (the switch 20 remains OFF and the solenoid 48 is not energized), and the conduit 39 to the cylinder portion 2 of the disc brake 80 in the rear wheel 20.

In the valve apparatus 36, the pressure receiving area of the stepped piston 62 is larger at the side of the master cylinder pressure chamber 65 than at the side of the master cylinder pressure chamber 64. When the master cylinder pressure becomes so high that the rightward fluid pressure due to the pressure receiving area difference overcomes the spring force of the spring 63, the stepped piston 62 is moved rightwards, and the rubber ring 73 attached to the top of the stepped piston 62 comes to contact with the valve seat 60b. Hereafter, the pressurized fluid from the master cylinder 31 is supplied to the cylinder portion 2 of the disc brake 80 in the rear wheel 40 through the master cylinder pressure chamber 64, and the ports 69, 70 only by opening valve ball 72.

The wheels 34 and 40 are braked. Thus, the automobile is decelerated. In the rear wheel 40, the brake linings 9, 12 of the pad plates 8, 11 are pressed to the disc rotor 10 rotated in the direction shown by the arrow R. The frictional forces occur between the disc rotor 10 and the brake linings 9, 12. Thus, the brake reaction force acts on the pad plates 8, 11 in the direction shown by the arrow A in FIG. 5. In FIG. 1, the pad plates 8, 11 are urged leftwards. Thus, the switch 20 remains turned off, and the solenoid 48 of the electro-magnetic valve 38 remains deenergized. It continues to take the position D.

When the automobile stops facing upwardly on the inclined roadway, the torque in the opposite direction to the torque during running occurs in the disc rotor 10 which has rotated with the wheel. Thus, the frictional force between the disc rotor 10 and the pad plates 8, 11 is inverted as shown by the arrow B. It overcomes the sum of the elastic force of the retainer 19 and spring force of the spring which is contained by the switch 20. Accordingly, the pad plates 8 and 11 are pushed rightwards (FIG. 1). The actuating rod 20a of the switch 20 is pushed inwards by the pad plate 8. The switch 20 is turned on. The solenoid 48 of the electro-magnetic valve 38 is energized. The electro-magnetic valve 38 is changed over to the position E. Thus, the side of the master cylinder 31 is intercepted from the side of the wheel cylinder portion 2. In that condition, when the driver releases the foot from the brake pedal 32, the brake fluid is returned to the master cylinder 31 from the wheel cylinder of the front wheel 34, but the brake fluid from the wheel cylinder portion 2 of the rear wheel 40 cannot be returned to the master cylinder 31, since the electro-magnetic valve 38 is in the closed condition. The pressurized brake fluid is held in the wheel cylinder portion 2 of the rear wheel 40. Thus, the automobile is maintained to stop facing upwardly on the inclined roadway.

In the valve apparatus 36, when the fluid pressure of the master cylinder 31 becomes so low that the rightward fluid pressure force to the stepped piston 62 becomes smaller than the spring force of the spring 68, the stepped piston 62 is moved to the shown position, and so the rubber ring 73 is separated from the valve seat 60b. The side of the conduit 37 is made to free communicate with the master cylinder pressure chamber 64. However, since the electro-magnetic valve 38 is already put into the closed condition, the brake force is kept in the rear wheel 40. The clutch is changed over into the neutral condition. In the prior art, it is necessary to tread the clutch pedal for holding the brake force. In this embodiment, the foot may be released from the clutch pedal.

When the solenoid 48 of the electro-magnetic valve 38 is energized, the operation display lamp 50 lights. Thereby, the driver can know that the electro-magnetic valve 38 operates and the braking force is held.

However, it is considered that the driver goes out of the automobile without applying the parking brake, disregarding or forgetting that facts. In this embodiment, the buzzer 43 buzzes to warn the driver of that fact. When the door is opened without opening the parking switch 51, the door switch 52 is closed, and the buzzer 53 is energeized. When the parking brake is applied, the parking switch 51 is opened. Accordingly, the buzzer 53 does not buzz.

In order to start the automobile, the gears are changed over, the clutch pedal is trodden to put the clutch apparatus into the semi-clutch condition and the acceleration pedal is trodden. The drive force is transmitted to the disc rotor 10 in the rear wheel 40. The frictional force between the disc rotor 10 and the brake linings 9, 12 is again inverted in direction. The brake reaction force to the pad plates 8, 11 acts in the direction A. Thus, the switch 20 is turned off, and the solenoid 48 of the electro-magnetic valve 38 is deenergized. The electro-magnetic valve 38 takes the position D. The communication between the sides of the master cylinder 31 and wheel cylinder portion 2 is made. The pressurized fluid held in the wheel cylinder portion 2 is returned into the master cylinder 31 through the valve apparatus 35 located in the shown condition. Thus, the brake is relieved and the automobile starts to run.

When the automobile is positively moved backwards on the upwardly inclined roadway, the gears are changed over for backward movement. The reverse switch 46 is closed to energized the relay 43. Thus, the movable contact is changed over to the other stationary contact 44. The switch 20 is deenergized. The electromagnetic valve 38 takes the position D. The pressurized fluid in the wheel cylinder portion 2 of the rear wheel 40 is returned to the master cylinder 31. Thus, the automobile can be freely moved backwards.

In the above, there has been described the normal case of the operation that the automobile stops upwardly facing on the inclined roadway. However, when the automobile is rapidly braked on the inclined roadway of some angle or when the automobile provided with some kind of suspension mechanism is rapidly braked on an inclined roadway, it is considered that the switch 20 in the rear wheel 40 cannot be stably maintained at the turned-on state. The valve apparatus 36 is provided for such a case.

When the automobile is rapidly braked in that case, there occurs so-called "nose-dive" phenomenon. Thus, the rear wheel side of the body tends to separate from the ground. Then, the body swings back and the rear wheel side of the body sinks down. And the body swings back and there occurs again "noise dive" phonemenon.

At the first "noise-dive", the switch 20 remains turned off, and at the swing-back, it is turned on. However, at the next "noise-dive", it is turned off. Thus, the switch 20 is not stably turned on with the stop of the automobile. As the result, the automobile is maintained to stop almost by the back torque of the front wheel, while the brake pedal remains trodden. The switch 20 is not always turned on after sufficiently long time. The valve apparatus 36 is provided for preventing such a case.

When the brake pedal is rapidly trodden and released from treading, the pressurized fluid begins to be returned to the master cylinder 31 from the wheel cylinder of the front wheel 34. However, the stepped piston 62 remains located at the right position in the valve apparatus 36, and the rubber ring 73 remains seating on the valve seat 60b, so long as the master cylinder pressure does not decrease so much. Accordingly, the pressurized fluid cannot be returned to the master cylinder 31 from the wheel cylinder portion 2 of the rear wheel 40. While the rubber ring 73 remains seating on the valve seat 60b, the back torque of the front wheel 34 decreases, and that of the rear wheel 40 increases, due to the tendency of the backward movement of the automobile. Thus, the switch 20 in the rear wheel 40 is turned on. Hereafter, the turn-on is maintained.

After the switch 20 is turned on, the master cylinder pressure is so decreased that the rightward fluid pressure force to the stepped piston 62 becomes smaller than the sum of the leftward fluid pressure force to the stepped piston 62 and spring force of the spring 63, and the stepped piston 62 is moved leftwards to the shown position. The free communication between the sides of the conduit 37 and master cylinder pressure chamber 64 is made, but the electro-magnetic valve 38 is already closed. Accordingly, the pressurized fluid cannot be returned to the master cylinder 31 from the wheel cylinder portion 2, but the braking force is held. The start of the automobile is effected in the same manner as above described for the normal case.

While the preferred embodiment has been described, variations thereto will occur to those skilled in the art within the scope of the present inventive concepts which are delineated by the following claims.

For example, in the above embodiment, the braking force to the rear wheel 40 cannot be increased for the automobile stopping facing upwardly on the inclined roadway. A check valve which permits the fluid flow towards the wheel cylinder portion 2 from the master cylinder 31, may be connected in parallel with the electro-magnetic valve 38. The pressurized fluid can be further supplied through the check valve to the wheel cylinder portion 2.

Further, in the above embodiment, the braking force is held only in the rear wheel 46. When it is not sufficient to stop the automobile on the inclined roadway, it may be held also in the front wheel 34. For example, a valve apparatus as already proposed, may be arranged between the master cylinder and the wheel cylinder of the front wheel. The valve apparatus is closed by the fluid pressure of the rear wheel. Instead of it, the valve apparatus 37 in the above embodiment may be used. In that case, the conduit 35 from the master cylinder 31 is directly connected to the electro-magnetic valve 38, the conduit 33 to the port 68 of the valve apparatus 36, the wheel cylinder portion of the rear wheel 40 to the port 66 thereof and the wheel cylinder of the front wheel 34 to the port 74.

Further, in the above embodiment, a clutch switch may be used instead of the parking switch 51. In that case, the clutch switch is opened by treading the clutch pedal.

Further, in the above embodiment, the switch 20 is arranged in the arm portion 7b of the carrier, in the disc brake 80, or at the lead-in side of the carrier 7 with respect to the disc rotor 10. However, it may be arranged in the arm portion 7a of the carrier 7, or at the lead-out side of the carrier 7 with respect to the disc rotor 10. In that case, the actuating rod 20a of the switch 20 is pushed inwards by the pad plate under non-braking condition, and the switch 20 is so designed as to be turned off under the pushed actuating rod 20a. Or when the switch 20 is turned on, an electric circuit may be so designed as to deenergize the solenoid 48 of electro-magnetic valve 38.

An inclination-detecting switch which detects the upward inclination of the road, may be connected in series with the solenoid 48 of the electro-magnetic valve 38.

Further, the disc brake is not limited to the construction shown in FIG. 1 to FIG. 3, but various kinds of disc brakes may be applied to this invention.

What is claimed is:

1. A brake control apparatus for a vehicle comprising:
   (A) brake apparatus for the respective wheels which are operated by pressurized fluid from a master cylinder;
   (B) an electro-magnetic valve arranged in a conduit connecting said master cylinder with at least one of said brake apparatus, said electro-magnetic valve being normally in the communicating state and being changed over into an intercepting state by as external instruction;
   (C) at least one of said brake apparatus being of the disc brake type, said one comprising;
      (a) a disc rotor;
      (b) first and second friction pad assemblies for engagement with opposite sides of said disc rotor, said assemblies being guided for movement towards said disc rotor;
      (c) a caliper body straddling the peripheral edge of said disc rotor and said first and second friction pad assemblies;
      (d) actuating means arranged in said caliper body for urging said first and second friction pad assemblies into engagement with said disc rotor; and
      (e) elastically deformable retainers for supporting said first and second friction pad assemblies in the peripheral direction:
   (D) at least one of said first and second friction pad assemblies being displaceable within a predetermined range in the peripheral direction in accordance with the change of the direction of the frictional force with said disc rotor; and
   (E) a switch movable by said peripheral displacement of said one friction pad assembly for generating said external instruction for said electro-magnetic valve.

2. A brake control apparatus according to claim 1, in which an actuating rod of said switch contacts with one side surface of said one friction pad assembly through said retainer.

3. A brake control apparatus according to claim 2, in which the sum of the spring force of said retainer and the force for changing over said switch is larger than the urging force of said one friction pad assembly towards said switch due to the contact between said one friction assembly and said disc rotor during no braking operation.

4. A brake control apparatus according to claim 2, in which said switch is fitted into a recess made in a relatively stationary member.

5. A brake control apparatus according to claim 2, in which vibration-absorbing or adiabatic material is inserted between said switch and the inside wall of said recess.

6. A brake control apparatus according to claim 5, in which said material is rubber.

7. A brake control apparatus according to claim 1, in which said apparatus further includes an inclination detection switch detecting that said vehicle runs facing upwardly on an inclined roadway, and said inclination detection switch is electrically connected in series with said switch and solenoid of said electro-magnetic valve.

8. A brake control apparatus according to claim 1, in which said vehicle includes front and rear wheels, and said brake control apparatus further comprises a valve apparatus arranged between said master cylinder and said front and rear wheels, and when the brake is relieved, the pressurized fluid is returned initially and preferentially from said front wheel into said master cylinder.

9. A brake control apparatus according to claim 8, in which said valve apparatus includes a stepped piston which receives at the larger area side the master cylinder pressure for said front wheel and at the smaller area side the master cylinder pressure for said rear wheel.

10. A brake control apparatus according to claim 1, in which a check valve is connected in parallel with said electro-magnetic valve, said check valve permitting fluid to flow from said master cylinder towards said one brake apparatus, while said check valve prohibiting fluid to flow from said one brake apparatus towards said master cylinder.

* * * * *